(12) United States Patent
Fallows et al.

(10) Patent No.: US 9,794,304 B2
(45) Date of Patent: *Oct. 17, 2017

(54) ENTERPRISE CLIENT-SERVER SYSTEM AND METHODS OF PROVIDING WEB APPLICATION SUPPORT THROUGH DISTRIBUTED EMULATION OF WEBSOCKET COMMUNICATIONS

(71) Applicant: Kaazing Corporation, San Jose, CA (US)

(72) Inventors: John R. Fallows, Palo Alto, CA (US); Frank J. Salim, Mountain View, CA (US); David B. Gaunce, Los Altos, CA (US); Siddalingaiah Eraiah, Fremont, CA (US)

(73) Assignee: Kaazing Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/256,093

(22) Filed: Sep. 2, 2016

(65) Prior Publication Data

US 2017/0054766 A1    Feb. 23, 2017

Related U.S. Application Data

(63) Continuation of application No. 12/772,046, filed on Apr. 30, 2010, now Pat. No. 9,459,936.
(Continued)

(51) Int. Cl.
*G06F 15/16* (2006.01)
*H04L 29/06* (2006.01)
(Continued)

(52) U.S. Cl.
CPC .......... *H04L 65/1069* (2013.01); *G06F 9/54* (2013.01); *H04L 5/16* (2013.01); *H04L 67/02* (2013.01);
(Continued)

(58) Field of Classification Search
CPC .................... H04L 65/102; H04L 65/1033
(Continued)

(56) References Cited

U.S. PATENT DOCUMENTS 6,434,607 B1 * 8/2002 Haverstock ........... G06F 17/211
707/999.009
7,752,536 B2 * 7/2010 Megiddo ............... G06F 17/246
715/200

(Continued)

*Primary Examiner* — Adnan Mirza
(74) *Attorney, Agent, or Firm* — Van Pelt, Yi & James LLP

(57) ABSTRACT

A request to establish a bi-directional full-duplex network connection is received. The request conforms to a half-duplex network connection protocol and the half-duplex connection protocol is a HTTP based protocol. The request is processed to determine a decision on whether to allow the bi-directional full-duplex connection. In the event the decision is to allow the bi-directional full-duplex connection, the bi-directional full-duplex network connection is established using the half-duplex network connection protocol. The bi-directional full-duplex connection utilizes a WebSocket communication protocol. Establishing the bi-directional full-duplex connection utilizes a plurality of half duplex connections. A confirmation that the bi-directional full-duplex network connection has been established is provided.

20 Claims, 8 Drawing Sheets

Related U.S. Application Data

(60) Provisional application No. 61/174,923, filed on May 1, 2009.

(51) Int. Cl.
*G06F 9/54* (2006.01)
*H04L 29/08* (2006.01)
*H04L 5/16* (2006.01)

(52) U.S. Cl.
CPC ............. *H04L 67/08* (2013.01); *H04L 67/42* (2013.01); *G06F 2209/541* (2013.01); *H04L 65/102* (2013.01); *H04L 65/1033* (2013.01)

(58) Field of Classification Search
USPC ................................................ 709/203, 296
See application file for complete search history.

(56) References Cited

U.S. PATENT DOCUMENTS

| | | | |
|---|---|---|---|
| 8,032,409 B1 * | 10/2011 | Mikurak | G06Q 10/00 705/14.39 |
| 2007/0100967 A1 | 5/2007 | Smith | |
| 2007/0174429 A1 | 7/2007 | Mazzaferri | |
| 2009/0037517 A1 | 2/2009 | Frei | |

* cited by examiner

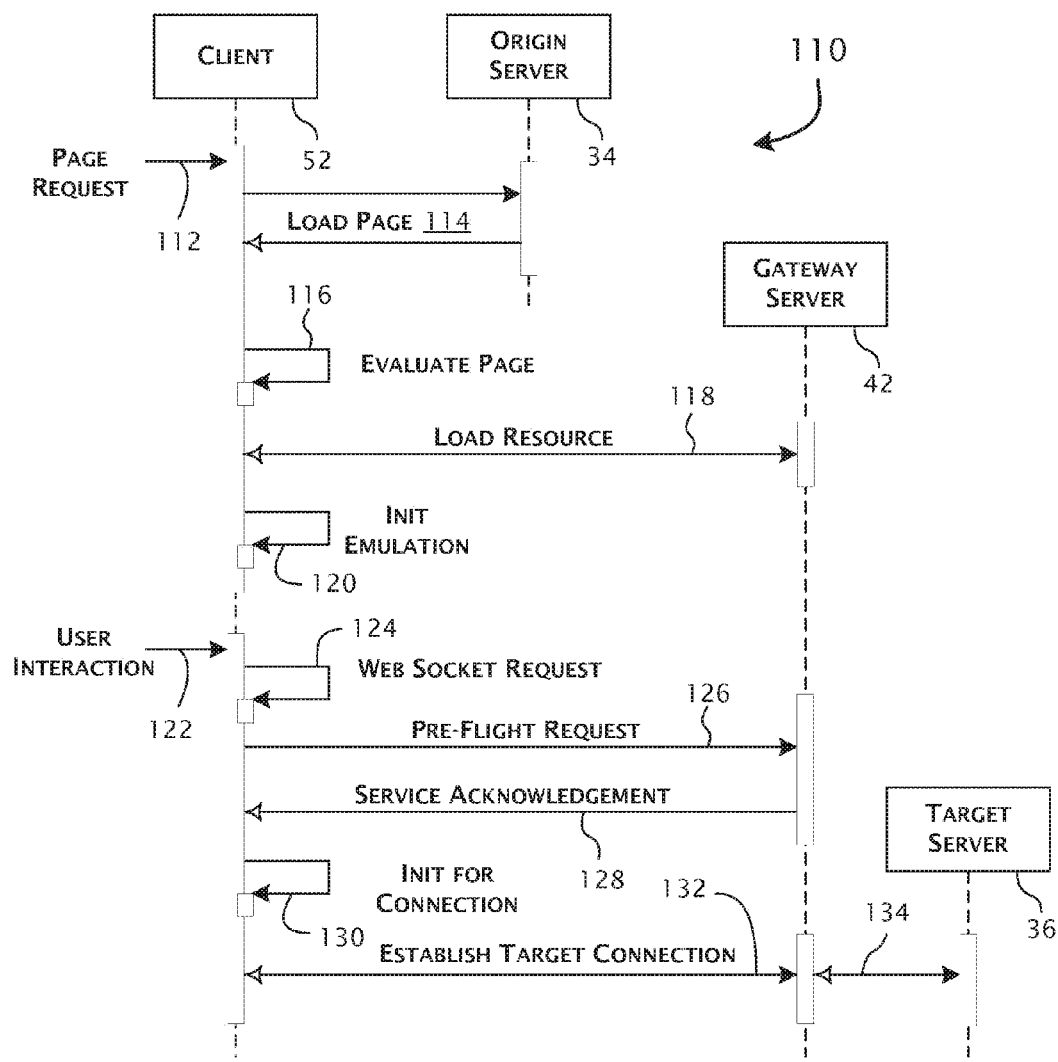

ENTERPRISE CLIENT-SERVER SYSTEM AND METHODS OF PROVIDING WEB APPLICATION SUPPORT THROUGH DISTRIBUTED EMULATION OF WEBSOCKET COMMUNICATIONS

This application is a continuation of co-pending U.S. patent application Ser. No. 12/772,046, entitled ENTERPRISE CLIENT-SERVER SYSTEM AND METHODS OF PROVIDING WEB APPLICATION SUPPORT THROUGH DISTRIBUTED EMULATION OF WEBSOCKET COMMUNICATIONS, filed Apr. 30, 2010, which claims the benefit of U.S. Provisional Application No. 61/174,923, filed May 1, 2009.

BACKGROUND OF THE INVENTION

Field of the Invention

The present invention is generally related to network communications systems and, in particular, to systems capable of supporting real-time, bidirectional communications over an HTTP-based network.

Description of the Related Art

While the development and use of Web applications continues to grow, a significant limitation exists in that the widely used HTTP protocol only supports half-duplex communication. As in the case of conventional client-server application use models, a continuous tier-to-tier bidirectional, or full-duplex, communications connection is highly desirable, if not required to enable client interaction with various backend systems. The demand for realtime services on the Web, such as to display realtime stock feeds, permit ad-hoc information updates, enable active participation among multiple users in realtime operations, particularly as encountered in bidding, chat, games, and other applications, is substantial and increasing.

Although other protocols, supported by proprietary client and server applications, might be utilized, the fact that the Web-browser client is ubiquitous effectively requires use of the basic HTTP protocol. Natively, conventional Web-browser based client applications have been basically constrained to communications where data requests and responses flow only in one direction at a time. Conventional attempts to emulate bidirectional communication typically involve the use of polling techniques, such as implemented in Comet and Reverse Ajax. In essence, a server, under select circumstances, is able to push information to the client. These techniques, however, suffer from many limitations, such as lack of standardization, inadequate performance, and limited scalability.

For example, a direct polling technique requires client application, typically implemented in the context of a Web-browser, to repeatedly send HTTP requests at regular intervals to a target Web-server. Each request immediately receives a server generated response potentially returning updated real-time information depending on whether the server has any updated information. Depending on the polling interval, the received information may not be really received in real-time and, conversely, may only be obtained subject to a high overhead of server requests frequently for no responsive information. This overhead impacts both client and server performance and consumes network bandwidth.

To avoid the overhead of direct polling, a variant known as long-polling has been developed. In long-polling, also known as asynchronous polling, the client application, again typically a Web-browser, issues a request to a target Web-server system. Rather than providing an immediate response, the target server will delay for up to some defined interval, waiting to have some new information to provide as a response. If some new, i.e., real-time data is obtained by the server during the delay interval, a server response containing the real-time information is then sent to the client. If no new information is received, an empty response is returned to the client application, terminating the pending request. Long-polling thus has the potential to reduce latency in the delivery of real-time data and may reduce the number of request/response cycles to some degree. Long-polling does not, however, provide any substantial performance improvements over traditional polling due to the still significant number of request/response cycles required and the similar number of HTTP headers, present in both long-polling and polling, that must be exchanged between client and server.

Streaming is another conventional variation. Where streaming is used, the client Web-browser sends a complete request, but the target server responds in a manner that allows the connection to be maintained open for at least a defined interval. In effect, the target server holds off acknowledging that the response is complete. This allows the target server to continue the response with additional real-time information as received by the target server. A benefit of establishing a streaming connection is reduced overhead on the part of the client and server systems. Network traffic is also reduced, since the client and server systems only send HTTP header pockets once to establish the streaming connection. Response continuance network packets are only sent as needed and then only contain data, thereby imposing minimal overhead. Unfortunately, streaming is encapsulated in HTTP and, thereby, entirely dependent on how low-level HTTP transfers are routed through the network at large. Streaming is therefore subject to unpredictable connection-breaking and substantial buffering latencies wholly determined by the myriad of systems that any given connection may be routed through. Conventional streaming is, therefore, not reliable.

As an alternative, the proposed HTML5 draft specification defines new protocol features, including WebSockets, Server-Sent Events, and associated access security requirements, as a way of enabling reliable bidirectional communications using the HTTP protocol. While the HTML5 specification is intended to standardize, among other things, full-duplex, direct TCP communication, a final specification is likely a year, if not several years from being formally adopted. Functional incorporation and operationally uniform adoption into the next generation of Web-browsers will not likely occur for many years. Further, resistance to update existing in-place Web-browsers due to practical, business, and other limitations, will likely prevent wholesale adoption for many more years.

Consequently, a need exists for a way to provide real-time, full-duplex communications capabilities substantially independent of the client Web-browsers that may be used to access Web services of all natures, including business and other commercial services, recreational, and informational.

BRIEF DESCRIPTION OF THE DRAWINGS

FIG. 7 is a sequence diagram illustrating the initialization and execution of a Web-browser client application in establishing an emulated WebSocket network connection in accordance with a preferred embodiment of the present invention.

DETAILED DESCRIPTION OF THE INVENTION

Figure 1:
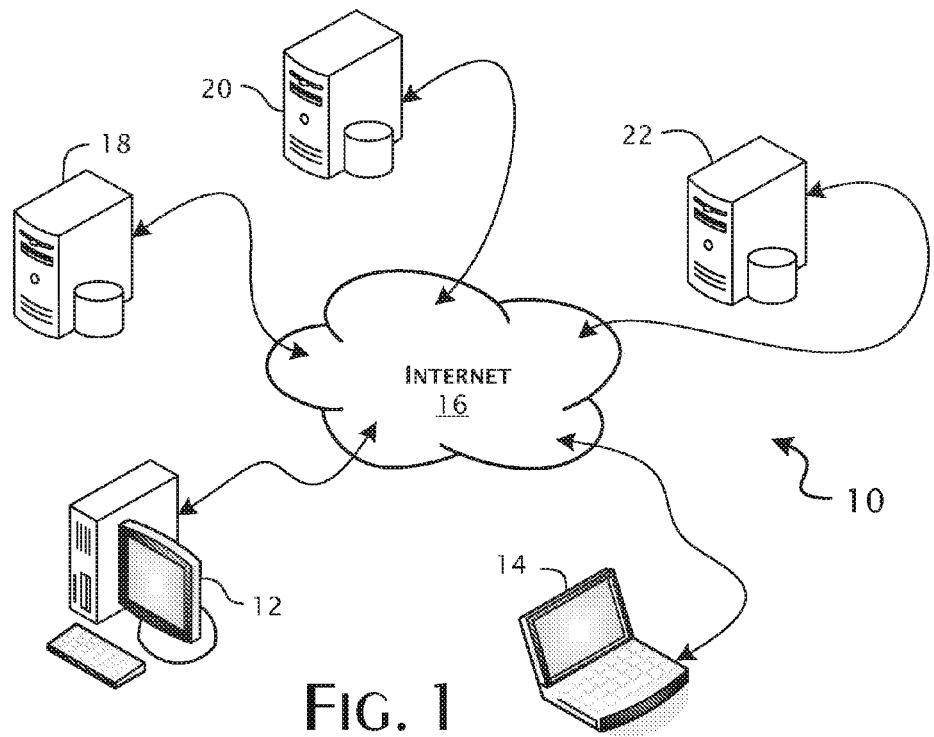
FIG. 1 is a general illustration of a preferred operating environment for a preferred embodiments of the present invention.

The present invention satisfies the need for real-time, full-duplex communications capabilities substantially independent of the current native capabilities of client Web-browsers that may be used to access Web services. In the following detailed description of the invention like reference numerals are used to designate like parts depicted in one ore more of the figures.

The draft HTML5 specification, including supporting specifications, defines the native architecture and operational features of WebSockets and Server-Sent Events (SSE) recommended for implementation in Web-browser and similar HTTP-based client applications. WebSockets and Server-Sent Events are premised on client applications being capable of utilizing full-duplex, direct TCP communication channels. In application 10 relevant to the present invention, as generally shown in FIG. 1, conventional client systems 12, 14 execute web-browser applications to access through the public Internet, private intranet, or other communications network 16, one or more remote server systems 18, 20, 22 to bidirectionally request and receive real-time information. In typical instances, an information request made through a Web-browser client executed by a client system 12, is directed initially to a primary or source server 18 and real-time, bidirectional information feed connections are established, as needed with other secondary servers 20, 22. For example, a Web-page may be requested from the source server 18 that, within appropriate, designated window areas within the user interface representation of the delivered page, presents real-time news stories from a news source server 20 and stock pricing information from a stock information server 22.

Conventionally, the transparent establishment of the real-time bidirectional, secondary connections with the servers 20, 22 in coordination with the source serve 18 depends on native support for WebSockets and Server-Sent Event support in the Web-browser clients executed by the client systems 12, 14. Absent widespread native WebSockets and Server-Sent Events support, further in a manner that is compatible across all major independent Web browser client implementations, establishment of Web socket based systems, commercial or otherwise, is not practical.

In accordance with the present invention, a gateway service is provided to enable conventional pre-HTML5 compliant Web-browser client implementations to immediately support fully compliant WebSockets and Server-Sent Events, even where specific Web-browser implementations have no or only some partial native implementation of the HTML5 standard. This gateway service may be implemented on an existing server 18, 20, 22 or, as in the preferred embodiments, on a separate dedicated gateway server system. Conforming native feature implementations, typically partial in nature, may be utilized where appropriate. Otherwise, the present invention implements an emulation system that achieves a functionally compliant system consistent with HTML5 specification conformant native implementations.

Figure 2:
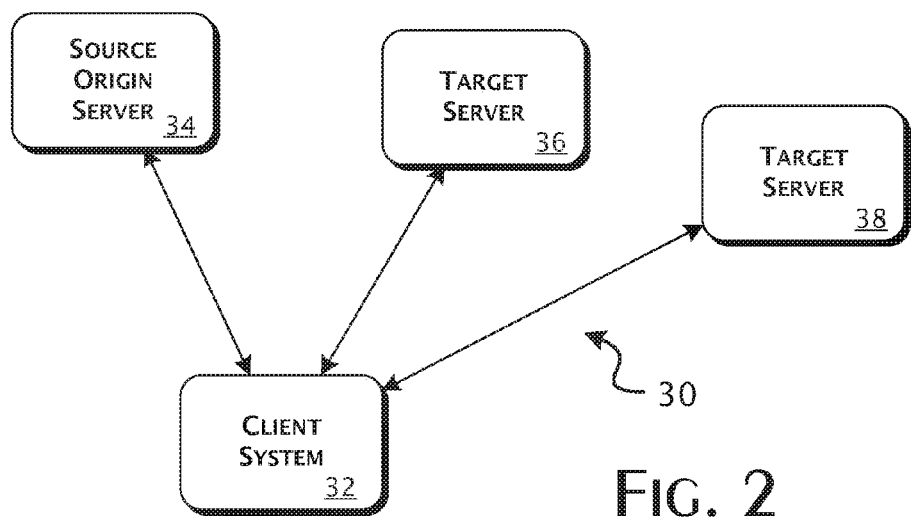
FIG. 2 is a block diagram illustrating a client/server system appropriate for the implementation of preferred embodiments of the present Invention in implementing a distributed client/server Web application.

Referring to FIG. 2, effective emulation of various aspects of WebSockets and Server-Sent Events is conventionally precluded by established security and functional limitations built into existing conventional standards compliant Web browsers, specifically those not fully compliant with the draft HTML5 specification. A key requirement of Web-Socket Server-Sent Event emulation is the ability to transparently implement cross-origin communications. Such communications are conventionally precluded by the existing standards specified same-origin security policy requirements. That is, documents, particularly including web-pages delivered to a client system 32 from a source origin server 34 are constrained to referring to and requesting certain resources only within the same origin scope. As generally defined, an origin is defined by a transport protocol, domain, and port number. The origin access restriction precludes cross-site scripting attacks as well as more generally preventing inadvertent interaction between documents sourced from different origins. Unfortunately, the conventional origin security feature also blocks non-malicious communication between pages having different source origin scopes. Conventionally, a document served from, for example, a source origin server 34 is prevented from accessing or exchanging data with a document or service served from any target server 36, 38 that is in a different origin.

Figure 3:
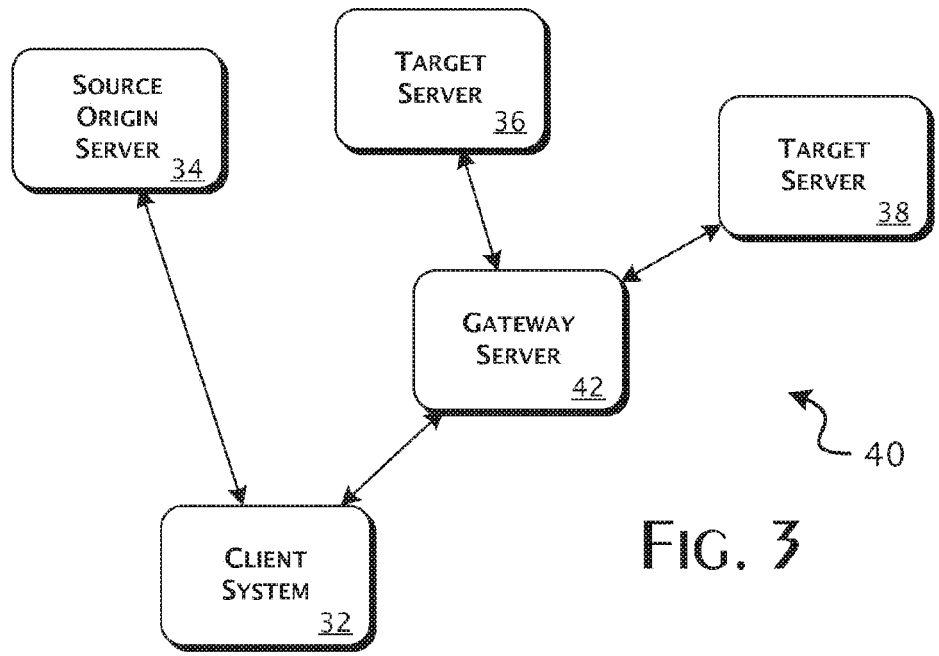
FIG. 3 is a block diagram illustrating a preferred client/server system appropriate for the implementation of a preferred embodiment of the present invention in implementing a distributed client/server Web application.

In accordance with the present invention, generally as shown in FIG. 3, a cross-document messaging system 40, constructed in accordance with the preferred embodiments of the present invention, selectively allows documents loaded by a client system 32 to securely interoperate across different origins. Target origin requests are defined, for purposes of the present discussion, as resource requests arising from a source origin document received from a source origin server 34 for documents or services provided by servers defined by an origin that is outside of the scope of that of the source origin server 34. If any of the specified domain, port, and transport protocol are different between source and target origins, the origin scopes differ and a request between those origins is a cross-origin request. In accordance with the present invention, target origin requests from the client system 32 are specifically directed to a gateway server 42 that, in turn, implements appropriate services to enable communications with target servers 36, 38. The gateway server 42 may and typically is in an origin that is outside of the scope of that of the source origin server 34 as well as that of the client system 32.

Figure 4:
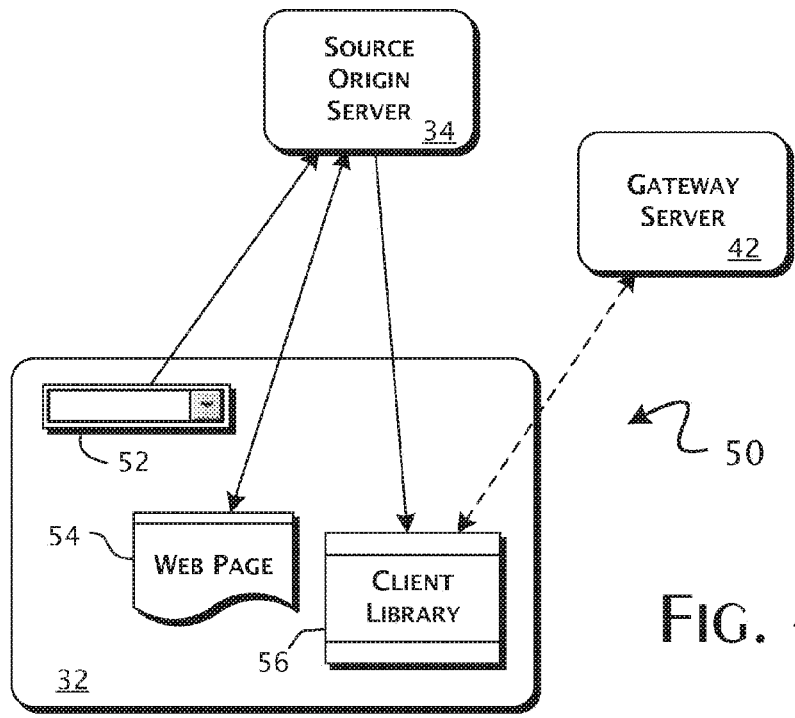
FIG. 4 provides a detailed block diagram illustrating a Web-browser client configured for implementing a client-side application in conjunction with a distributed client/server Web application consistent with a preferred embodiment of the present invention.

As represented 50 in greater detail in FIG. 4 a Web-browser client application 52, executed on the client system 32 issues a request to a user selected source origin Web-server 34. Upon evaluation, the source origin Web-server 34 returns a request corresponding Web-page document 54. Preferably, the Web-page document 54 is pre-coded to include an identification of an initial configuration resource to be retrieved. When the Web-browser client application 52 encounters the object reference, the initial configuration resource request is issued to the source origin Web-server 34, returning a corresponding client library 56. Depending on the nature of the object referenced resource, one or more files may be returned as part of the client library 56. Preferably, the Web-page document 54 is also pre-coded with an initial target reference that serves to identify a designated gateway server 42 operating on behalf of the source origin Web-server 34.

Figure 5:
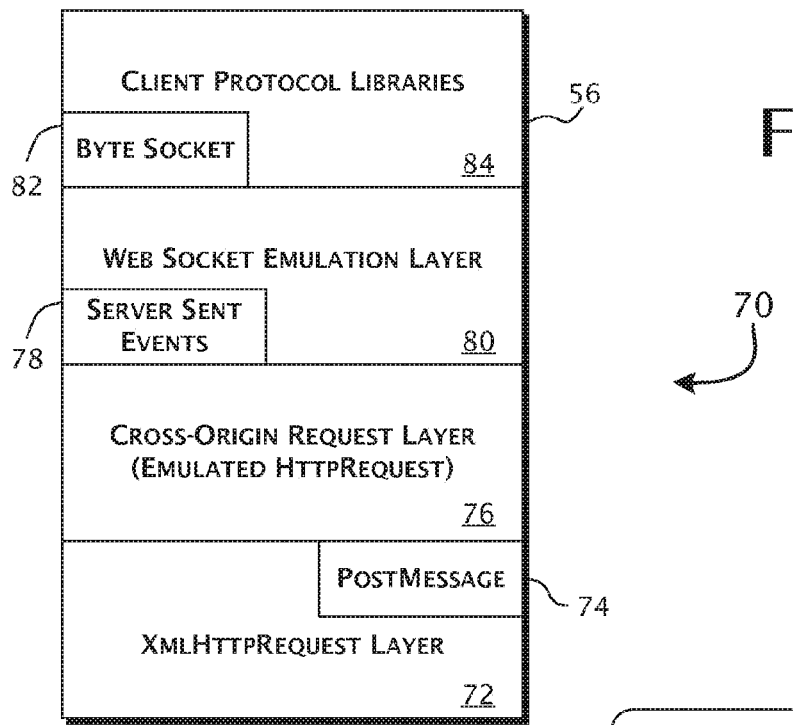
FIG. 5 is a block diagram of a client library implemented as a layered library stack consistent with a preferred embodiment of the present invention.

A preferred embodiment of the client library 56 is generally shown in FIG. 5 as a layered library stack 70. Collectively, the client library 56 provides for a functional HTML5 compliant WebSocket emulation when executed in a conventional pre-HTML5 compliant Web browser application 52. Lower-level, more fundamental layers are located at the bottom of the layered library stack 70, with higher level functions being progressively provided in the upper layers. Additional layers, other than those shown in FIG. 5, exist in conventional pre-HTML5 compliant Web-browsers. Web-browser application layer plugins, including Adobe Flash, Microsoft Silverlight, and Oracle Java, may also be utilized if present within the Web-browser execution environment.

The base of the client library 56 is a conventional XmlHttpRequest (XHR) layer 72, nominally present without required emulation in pre-HTML5 compliant Web-browsers. The XmlHttpRequest layer 72 provides an application programming interface (API) that enables HTTP and HTTPS requests to be sent directly to a designated target Web-server system. The server response is received directly as data that is then available through the API for use by the Web-application that initiated the request. Nominally, the execution and completion of XmlHttpRequests are constrained to a single origin. That is, the request source and target Web-server systems must exist within the scope of a common origin.

A PostMessage layer 74 is provided to support emulated cross-origin messaging by providing additional API calls accessible to Web-applications executing within the context of the client browser 52. As implemented in the preferred embodiments of the present invention, the PostMessage layer 74 manages the strict security policy implementations of conventional Web-browsers, yet securely allow multiple frames defined by a single, base Web-page document to communicate even where the documents embedded within those windows are loaded from different origins. Communication between the base document and documents embedded within the page is permitted through the PostMessage layer 74 provided the target explicitly expects and accepts messages from the named source origin. Bidirectional communication is supported where the source explicitly listens for and accepts messages from the named target origin. Some current conventional Web-browsers support an initial native implementation of the postMessage API. The PostMessage layer 74 preferably detects the existence and compliance of any existing postMessage API. In the absence of a native postMessage API or if the native postMessage API is non-compliant, the PostMessage layer 74 is enabled to handle, through emulation, all postMessage API calls.

In the preferred embodiments, the PostMessage layer 74 emulates the postMessage API utilizing an implementation dependent on the nature of the embedded window technology, typically being JavaScript, Flash and Silverlight. For each, an embedded document, or the equivalent, is retrieved within the scope of the embedded window origin. This embedded document functionally provides for bridge commutations processing compatible with the postMessage API. In the case of JavaScript, consistent with the currently preferred embodiments, emulation is implemented in a structured manner using client iframes as bridges to corresponding origins handled by the gateway server 42 and thereby functionally establish source to target communications paths. PostMessage messages are communicated through the iframes as short data segments transferred as URL id fragments, typically the post-"#" part of the iframe URL. Larger messages are split into multiple data segments for transfer. In the case of Java, Flash and Silverlight, the installed runtimes, operated in combination with the window corresponding embedded documents, provide a basis for establishing communications using a technology-corresponding bridging mechanism as constructed in accordance with the present invention.

A Cross-Origin Request layer 76 provides an emulation of the W3C Cross-Origin Resource Sharing (CORS) specification accessible through an HTML5 compliant cross-origin resource sharing API. The Cross-Origin Request layer 76 is enabled where the Web-browser client either does not support native cross-origin resource sharing or the native implementation is not compliant. As implemented in a preferred embodiment of the present invention, cross-origin resource sharing is emulated in the Web-browser client 52 through leveraged use of the PostMessage layer 74 and XmlHttpRequest layer 72. Cross-origin resource requests are processed through the Post Message and XmlHttpRequest layers 74, 72 and connected through the gateway server 42 to a specified target origin served by a corresponding target server 36, 38. In the preferred embodiments of the present invention, the gateway server 42 implements an HTML5 compliant cross-origin resource sharing component capable of establishing specification conformant connections to the target servers 36, 38.

A Server-Sent Events layer 78 allows Web-clients to connect to an HTML5 compliant Server-Sent Events stream. The Server-Sent events layer 78 locally manages a stream of data as sent from a remote target server to a Web-browser 52.

The server-sent stream of data is conventionally implemented as a unidirectional asynchronous series of network messages, transmitted downstream to the Web-browser client 52. Although some conventional Web-browsers have early native implementations of the SSE protocol, preferred embodiments of the present invention provide a complete implementation of the Server-Sent Events layer 78 by extending the agent-specific native implementation. That is, the Server-Sent Events layer 78 detects the current agent and supplements functionality as necessary to complete support for the SSE protocol. Where even partial native support is unavailable or unusable, the Server-Sent Events layer 78 performs a full emulation as appropriate to support the SSE protocol. In the preferred embodiments of the present invention, the gateway server 42 implements a program to manage a cross-origin XMLHttpRequest response streaming connection with the Web-browser client 52, to keep an HTTP response open while listening for additional messages sourced from an upstream target server operating at the source of a Server-Sent Events stream.

A WebSocket emulation layer 80 supports bi-directional connections. When established, the connections link a Web-browser client 52 directly with a back-end service, typically hosted on a target server 36, 38. Once established, the connection remains open and both the client and server can send information back and forth asynchronously. The WebSocket emulation layer 80 supports text-based protocols, such as Jabber, IMAP, and others. In the preferred embodiments, the WebSocket emulation layer 80 provides a full implementation of the HTML5 compliant WebSocket API.

A ByteSocket layer 82 is preferably provided to support binary data transmission through the WebSocket emulation layer 80. No corresponding binary transport protocol specification is provided by the W3C or IETF. In accordance with the present invention, the ByteSocket layer 82 implements an API that generally parallels the WebSocket API. The ByteSocket API provides additional methods to allow the reads and writes of binary primitives, including primarily byte values. The ByteSocket layer 82 enables implementation of the full range of binary protocols and, in addition, apply binary compression and encryption over the network for text-based protocols.

Additional, typically specialized, client protocol libraries may be included in the client library 56 as part of a client protocol library layer 84. These client protocol libraries will typically implement application or server specific protocols. In a preferred embodiment of the present invention, the client protocol library layer 84 can include an XmppClient client library that implements the conventional XMPP protocol used, for example, by Google Talk. Preferably, the XmppClient client library utilizes the WebSocket emulation layer 80 to exchange XMPP text-oriented messages.

The client protocol library layer 84 can also include a StompClient client library that implements Streaming Text Orientated Messaging Protocol (Stomp). Preferably, the StompClient client library utilizes the ByteSocket client library to exchange Stomp messages with remote servers executing Stomp-compliant applications, such as Apache ActiveMQ. Similarly, an IrcClient client library can be provided to support message exchange with remote Internet Relay Chat (IRC) servers. More specialized client libraries, such as a Remote Frame Buffer client library, can be implemented to support specialized bidirectional protocols. The Remote Frame Buffer protocol is utilized by Virtual Network Client (VNC) implementations to transmit keyboard and mouse events and receive graphical screen updates over a network.

In alternate embodiments of the present invention, during initialization of the emulation layers 70, a test is implemented to detect the potential presence of the Flash plugin within the execution context of the Web-browser client 52. If detected and suitably configured to allow use as an adjunct to emulation, the emulation layers 70 may selectively delegate certain networking and socket communications operations to the plugin, sufficient to establish single TCP socket connection with a designated gateway server 42. That is, while a Flash plugin is generally used to support UI operations, selective advantage can be taken of the limited networking layer and limited socket capability built into the plugin. By utilizing only network and socket layer aspects, no visible display artifacts are created. The Flash plugin is, however not always available, configured in a usable manner, or usable due to the existence of firewalls, HTTP Proxies, and other communications barriers. Use of the networking layer provided by the Flash plugin may still be made under limited circumstances.

In typical use, Web applications are implemented as a combination of a client-side application executed by a Web-browser client 52 and a distributed server-side application functionally implemented in some combination by the source origin server 34 and one or more target servers 36, 38. Object references in the Web-page 54 enable the Web-browser client 52 to initially load the client-side application as one or more documents. The client-side application will be typically designed to interact with and use the APIs associated with the Server-Sent Event layer 78, WebSocket layer 80, and byte socket layer 82. While the WebSocket layer 80 is expected to be the predominant API used, all of the layers are available for use by a client side application.

Figure 6:
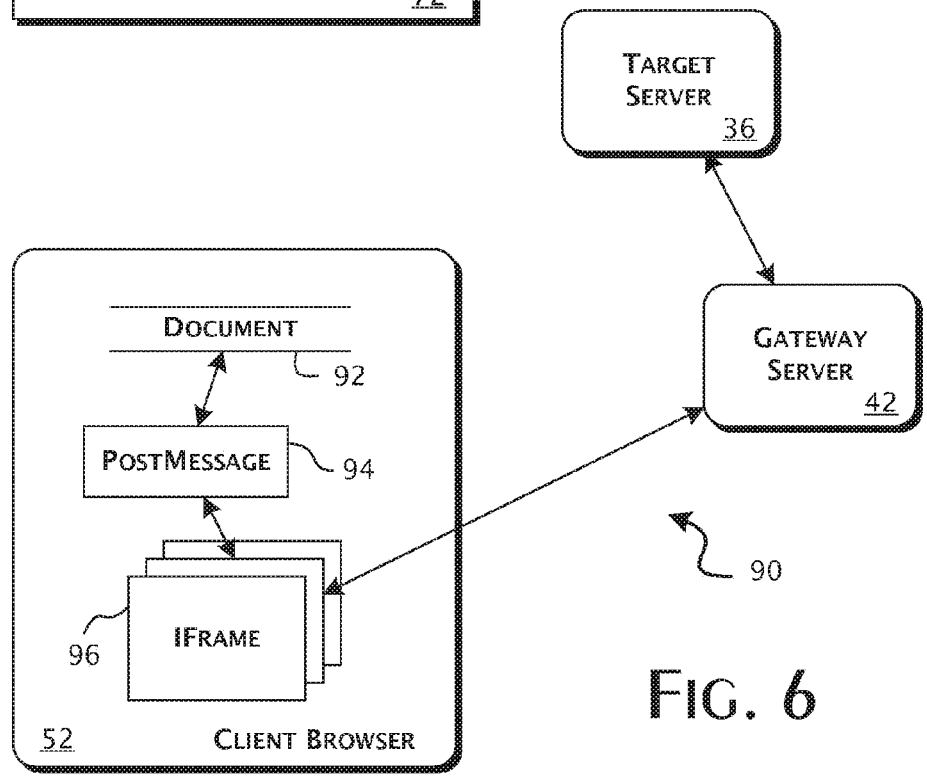
FIG. 6 is a block diagram detail illustrating a preferred iframe-based implementation of a Web-browser client application in accordance with a preferred embodiment of the present invention.

Referring to FIG. 6, a client side application is represented as an executable document 92 within the context of the Web-browser client 52. As implemented in the preferred embodiments of the present invention, API calls to the client library 56 due to execution of the document 92 will ultimately be realized as a postMessage request 94. Each postMessage request 94, at a minimum, is defined by relevant source and target origins and an operation represented by the request. The source origin is that of the document 92. By the nature of the emulation implemented, the target origin for the message is effectively that of the gateway server 42. Multiple gateway servers 42 may be concurrently implemented for load balancing and relative geographical reasons. In practice, a postMessage request 94 will also identify a target gateway server 42.

Where the client side application implementing technology is JavaScript, one or more iframes 92 are established as a communications bridge. Each cross-origin XmlHttpRequest processed through the cross-origin request layer 74 will be realized as a corresponding post Message request 94 that is, in turn, preferably passed as a document event to an iframe 96 instance. The iframe 96 instance is selected based on the unique combination of source and target origins associated with the request, where the target origin again corresponds to the origin of a servicing gateway server 42. In the preferred embodiments of the present invention, iframe 96 instances are created as needed and persist preferably until either the Web page 54 or the Web-browser client 52 is closed. Where an iframe for a combination of source and target origin has not yet been created, the PostMessage layer 74 creates a corresponding iframe 96 and, through a pre-flight request/response transaction with the gateway server 42, a trust relation is established through the iframe 96 instance.

From the perspective of the gateway server 42, the occurrence of the pre-flight request is consistent with a standard CORS pre-flight request, thereby permitting CORS compliant Web browsers to interoperate with the gateway server 42. As part of establishing the trust relation, a communications bridge routine is downloaded from the gateway server 42 into the iframe 96 instance to implement the target side of the postMessage API within the iframe 96 instance. By virtue of the trust relation, an XmlHttpRequest corresponding to the initiating postMessage request can then be transmitted to the gateway server 42 and forwarded, as appropriate, to a servicing server, such as the target server 36. In the preferred embodiments of the present invention, a mapping is administratively established on the gateway server 42 to define services provided by other target servers 36. 38 accessible through the gateway server 42. Thus, where a postMessage request represents a WebSocket request, a typical result is the establishment of a bidirectional capable connection between the document 92, through the corresponding iframe 96 instance, the gateway server 42 to a remote service, typically as provided by the target server 36, operating as a real-time, asynchronous source of data to the document 92.

Verification of the source origin is preferably performed by the gateway server 42. In the JavaScript emulation environment, the gateway server 42 verifies that each received request includes an XMLHttpRequest "Referer" header having a value that matches the target origin of gateway server 42, and an XMLHttpRequest "X-Origin" header having a value of a permitted source origin. Preferably, the value of the "X-Origin" header is determined by the communications bridge routine downloaded from the gateway server 42 into the iframe 96 instance. Since the gateway server 42 originates the communications bridge routine and the communications bridge routine determines the source origin of the document 92 containing the iframe 96 instance from the Web-browser client 52, the value of the "X-Origin" header can then be trusted by the gateway server 42 to accurately identify the source origin of the request.

For other client side application implementing technologies, such as Flash and Silverlight, a similar emulation architecture is used. In general, the postMessage request 94, dependent on the technology identified, will create a corresponding sub-window, similar to an iframe 96, within the base document 92. Initialization of the window will result in a document or equivalent to be referenced and retrieved from the gateway server 42 as part of or equivalent to a pre-flight request/response transaction. The retrieved document, in the preferred embodiments of the present invention, functionally includes a communications bridge routine that implements the target side of the postMessage API, thereby allowing, as needed, a secure communications path between the base document 92 and sub-window document.

A preferred process 110 of establishing trust relationship with a gateway server 42 is generally shown in FIG. 7. In response to a conventional page request 112, typically initiated by a user of the Web-browser client 52, a load page request is issued to an origin server 34, as identified by the request 112. The corresponding page is loaded 114 and initially evaluated 116 to locate and load any additional objects required by the page. In the preferred embodiments of the present invention, a page embedded reference to the client library 56 results in an essentially static resource load 118 from the embedded reference identified gateway server 42. The Web-browser client 52 completes initializations 120 related to the page loaded, including any requisite initialization of the client library to detect and establish emulation intercepts into the Web-browser client for client library layers 70.

In response to an initiating event, typically resulting from some user interaction 122 or autonomous operation of the document 92, a WebSocket, byte socket, cross origin request, or other request is made against the client library layers 70. For purposes of example, the request is a WebSocket request that originates from a JavaScript client application represented by the document 92. The request is further specified as requesting connection to a particular service provided by the gateway server 42. The request is processed 124 into the PostMessage layer 74. In accordance with the preferred embodiments of the present invention, where an appropriate iframe 96 instance does not yet exist, an iframe is created with a functional source origin identifying the source origin of the Web page base document 54 and a functional target origin identifying the effective location of the service. Creation of an iframe in JavaScript may be implemented, for example, with the following code:

```
ifrm = document.createElement("iframe");
ifrm.setAttribute("src", "http://gateway.com:2750/stockService");
document.body.appendChild(ifrm);
```

The functional source origin of the iframe is not explicitly set, but is automatically determined by a call by the communications bridge routine to the Web-browser client 52. This call is preferably made during the initialization of the communications bridge routine following the creation of the iframe 96 instance and download of the communications bridge routine into the iframe 96 instance. The functional source origin of an iframe 96 instance is thus determined as the source origin of the document 92, for example "http://retailer.com:80", responsible for the creation of the iframe 96 instance. The functional target origin is specified explicitly using the "src" attribute as, for example, "http://gateway.com:2750".

A pre-flight XmlHttpRequest message, preferably identifying the relevant source and target origins of the initiating postMessage request, as well as the requested service, is then sent 126 to the designated gateway server 42. An administratively established service access policy on the gateway server 42 is evaluated against the request. In a preferred embodiment of the present invention, the policy is generally of the form:

```
<service>
    <accept>ws://gateway.com:2750/stockService</accept>
    <connect>tcp://target.com:1330</connect>
    <type>proxy</type>
    <cross-site-constraint>
        <allow-origin>http://retailer.com:80</allow-origin>
    </cross-site-constraint>
</service>
```

Thus, the specific cross-origin resource request from "http://retailer.com:80" to "ws://gateway.com:2750" for a service "/gwStockService" is determined acceptable. The request will be further supported by creation on demand by the gateway server 42 with the establishment of a TCP-based WebSocket connection to an actual service source "tcp://target.com:1330/stockService" provided, by way of example, by a remote target server 36. In the preferred embodiments of the present invention, various services requestable by Web-browser client applications 92 may be hosted directly on the gateway server 42. The connection specified by the service access policy is, in such cases, a connection reference to localhost.

Dependent on the evaluation of the service access policy, an acknowledgment message is returned 128. If the service connection is not permitted for any reason, the originating request 124 essentially fails. Where permitted, the necessary emulated support for a WebSocket connection is initialized 130. In the preferred embodiments of the present invention, this includes installing within the iframe 96 instance a postMessage listener to handle incoming request events, generally as shown in the following JavaScript example:

```
var xhr;
window.onmessage = function(event) {
    // Create an XMLHttpRequest on the first outgoing transmission
    if (!xhr) {
        xhr = new XMLHttpRequest( );
        // when downstream messages arrive,
        // post them to the parent window
        xhr.onprogress = function(event) {
            // process the incoming event and
            // send it to the parent document
            window.postMessage(xhr.responseText,bridgeOrigin);
        }
    }
    // if necessary send a pre-flight request
    // ...
    // gateway.com:2750 is the URL of the Gateway in the target origin
    xhr.open(method, http://gateway.com:2750, true);
    // then, send the data contained in the postMessage
    xhr.send(event.data)
}
```

The postMessage request corresponding to the WebSocket request 124 is then functionally converted to an XmlHttpRequest. Specifically, the HTML5 compliant postMessage request is called on a window, representing a target document, within a base Web page 54 document. The request passes a message, represented as postMessage data, and the source origin of the request. Where an iframe 96 instance has been previously established, the postMessage request is passed through the PostMessage 74 API.

The request is then transmitted to the gateway server 42 and qualified based on service access policy. The gateway server 42, in turn, establishes a corresponding connection 134 with the identified target server 36. The nature of the connection 134 depends on the nature of the requested service, and may be, for example, a TCP or WebSocket connection. The response to the XMLHttpRequest is received and passed back through the iframe chain to return the responsive data payload to the base Web-page 54 document. Subsequent WebSocket requests 124 reuse the iframe 96 instance, thereby making leveraged use of the established trust relationship between the source and target origins.

Figure 8A:
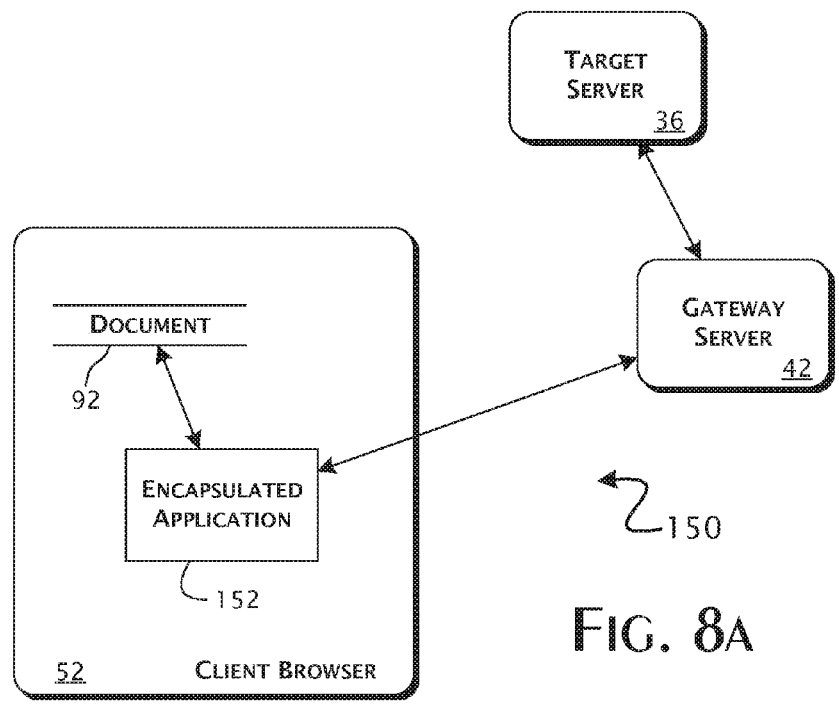
FIGS. 8A and 8B are block diagrams illustrating preferred encapsulated implementations of a Web-browser client application as constructed in accordance with a preferred embodiment of the present invention.

In regard to other Web-browser client application 92 technologies, interactions with the base page 54 may be limited. As generally shown in FIG. 8A, the Web-browser base page 54 may embed an encapsulated Flash, Silverlight, or other application 152 with limited, if any, requisite interaction with another Web-browser client application 92 embedded in the base page 54. In the preferred embodiments of the present invention, such encapsulated applications 152 may be loaded as resources 118 from the gateway server 42.

In the case of a Flash encapsulated application 152, the Flash runtime library provided as part of the Flash plugin includes a generally proprietary network and socket-like communications capability. The client library 56 is preferably included as part of the encapsulated application 152, allowing the encapsulated application 152 to communicate directly with the gateway server 42 external services. Such communications are same-origin.

Figure 8B:
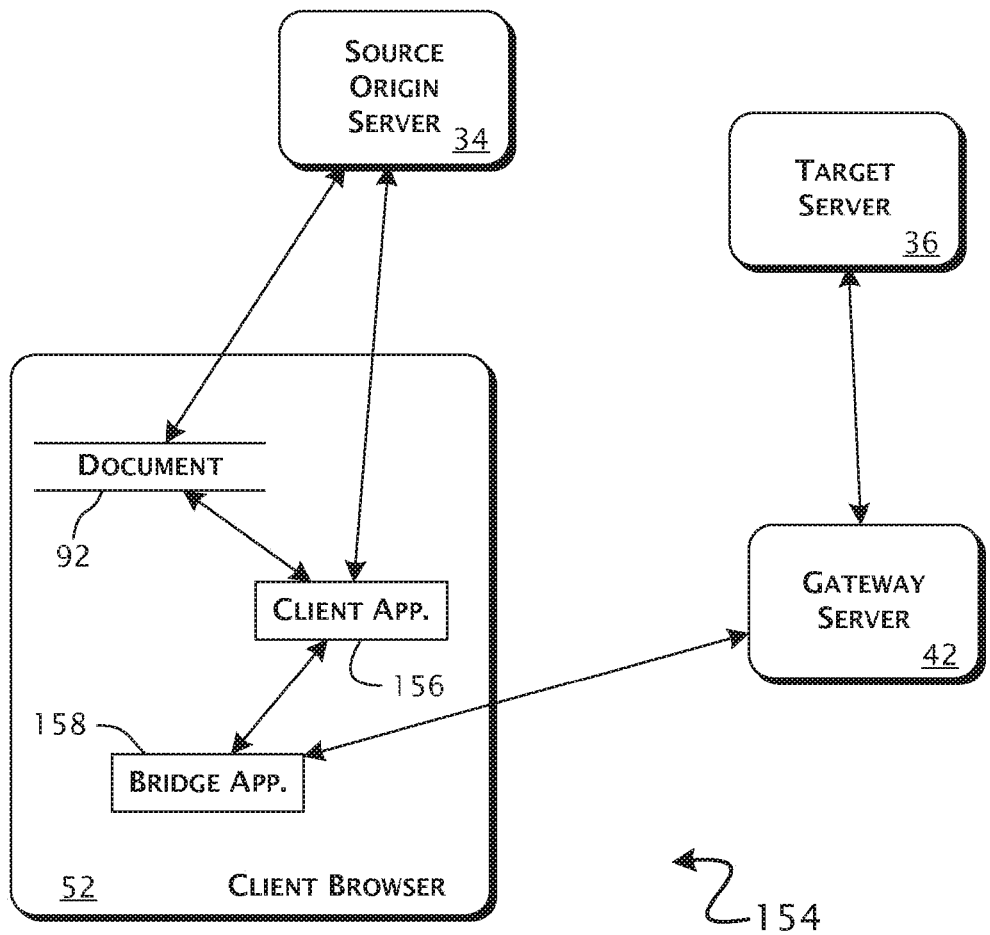

The preferred Flash embodiments of the present invention provide support for Flash application execution with cross-origin resource sharing. Referring to FIG. 8B, the document 92 loaded from the source origin server 34 includes a reference to a Flash client application 156 also loaded from the source origin server 34. The Flash client application 156, as executed by the Web-browser client 52, therefore executes within the source origin of the document 92 and source origin server 34. The Flash client application 156, in turn, includes a reference to a Flash bridge application 158, further specified to be loaded from the gateway server 42. The Flash bridge application 158 therefore executes within the target origin of the gateway server 42.

The Flash client and bridge applications 156, 158 are preferably implemented as Flash movie files loaded as SWF file format documents. The Flash client application 156 preferably includes the client library 56. In accordance with the present invention, a secure communications capability is established between the Flash client and bridge applications 156, 158 as an analogue of the postMessage communications through iframes. Preferably, this channel is established using shared events, as supported through the Flash runtime library, thereby allowing data to be dispatched bidirectionally. This communications channel is secured to a unique combination of source and target origins by requiring the Flash bridge application 158, through execution, to verify and only communicate with a Flash client application 156 identified with a source origin qualified by the gateway server 42. In initialization of the communications channel, the source origin of the Flash client application 156 is retrieved by the Flash bridge application 158 from the LoaderInfo metadata of the Flash client application 156. This source origin is returned to the gateway server 42. Provided the origin is allowed, on evaluation of an administratively established security policy local to the gateway server 42, the Flash bridge application 158 is, by return message, enabled for shared event communications with the Flash client application 156. Once enabled, the client-side Web-application implemented by the Flash client application 156 can access cross-origin the gateway server 42 as needed to access remote services provided by, for example, target server 36.

Alternately, the Flash client application 156 can communicate directly with the gateway server 212 using a WebSocket correction. If a native WebSocket connection is desired, the Flash bridge application attempts to issue a WebSocket request to the target gateway server 42. Rather than communicating through a Flash bridge application 158, initial execution of the Flash client application 156 issues a WebSocket connection request through the client library 56 as provided as part of the Flash client application 156. This connection request is emulated using the Flash runtime to request a socket-based connection with the gateway server 42. A Flash cross-domain policy file is then retrieved from the origin of the intended WebSocket connection. The gateway server 42 is preferably configured to specifically listen for such request and return a valid Flash cross domain policy file. The Flash runtime underlying the Flash client application 156 evaluates the policy and determines whether a cross-origin WebSocket connection with the target origin is permitted.

An example cross-domain policy file is as follows:

```
<cross-domain-policy>
    <allow-access-from domain="retailer.com:80" to-ports="2750"/>
</cross-domain-policy>
```

Provided the Flash runtime receives a compliant policy file and the from-domain matches the source origin of the Flash client application 156, the runtime allows the client library to open a socket to the target origin on the specified port and communicate via the native WebSocket protocol. As part of the WebSocket protocol handshake, cookies for the target origin are also required to be sent. However, the native socket connections do not transmit cookies by default, so a minimal HTTP request is also sent to the target gateway in order to discover any cookies attached to the target domain. The cookies are parsed from the HTTP response and included in WebSocket handshake communications.

The implementation of cross-origin communication in desktop and applet Java clients preferably employs a similar client application 156 and bridge application 158 architecture. For a Java client application 156, the application code is loaded in a .jar file, preferably including a Java implementation of the client library 56, from the source origin server 34. The Java client application 156 is thus in the source origin of the document 92. On initial execution, the Java client application 156 will make a request to load the bridge application 158, also provided as a .jar file, from the gateway server 42. The load of the bridge application 158 is permitted. Execution is in the target origin.

The Java client runtime includes a sockets and HTTP request library implementation. If native WebSocket protocol connection is desired, the bridge application 158 can make a socket connection to the gateway server 42. If emulated WebSocket protocol is instead necessary, for example, as required to traverse intervening proxy servers, the runtime HTTP request library is used.

To segregate code from different origins from interacting in an insecure manner, the Java runtime loads classes from different origins in different "class loaders". By default, code loaded in one class loader cannot access or execute code loaded in another class loader. However, code that is core to the runtime system is loaded in a special "runtime class loader" which can be safely accessed by any other code. To create a communications channel between the Java client and bridge applications, as a postMessage analogue, code in the client library 56, within the client and bridge .jars both instantiate an interface or extendable class existing as part of the core Java runtime. This class, being loaded on the runtime class loader, is accessible to both the Java client application 156 and the Java bridge application 158. An example class that could be used for this purpose is the standard Java class "java.beans.PropertyChangeSupport". This class is available in the Java runtime in all execution environments and, as such, can be called by the Java client application 156 and the Java bridge application 158 without incurring a security exception. The PropertyChangeSupport class, and other such classes, are sufficiently generic to allow extension or implementation that permits arbitrary data to be passed in both directions.

As is also required in other client runtime environments, the reported source origin of any target communications must be accurate and protected from tampering. In order to guarantee accuracy, the Java bridge application 158 implements a call to the Java runtime environment to determine the source origin of the Java client application 156. Specifically, the Java bridge application 158 makes a call to load a .class file known to exist within the .jar file of the Java client application 156. Where, for example, this .class file is named "SourceOriginLocation.class", the Java bridge application 158 makes the following call to load the class:

URL url=getClassLoader( ).getResource("SourceOriginLocation.class");

The returned URL value will include an identification of the origin of the loaded .class file and, therefore, the source origin. For example, if the name of the Java client application 156 .jar file is "client.jar", the returned URL would be of the form:

jar:http://retailer.com:80/client.jar!/SourceOriginLocation.class where "http://retailer.com:80" is therefore the source origin of the Java client application 156. This source origin is then delivered to the gateway server 42 during any connection, allowing the gateway server 42 to validate and selectively permit cross-origin connections from this source origin. As the Java client runtime can itself be trusted to return the correct resource string during class loading, the source origin value can also be trusted.

Figure 9:
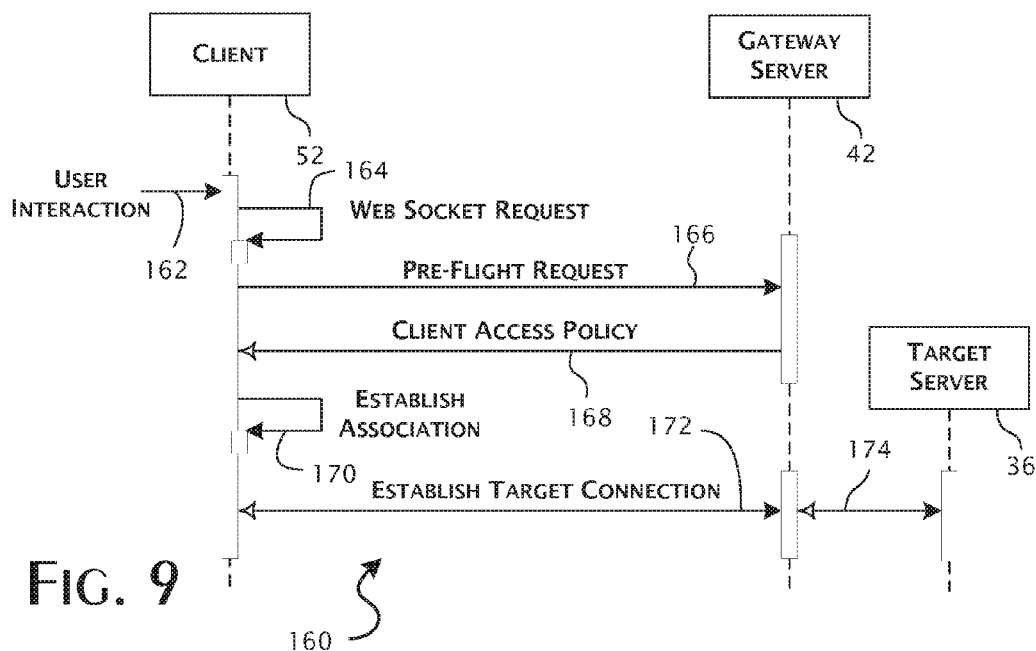
FIG. 9 is a sequence diagram illustrating the execution of a Web-browser client encapsulated application in establishing an emulated WebSocket network connection in accordance with a preferred embodiment of the present invention.

A limitation exists in the case of a Silverlight encapsulated application 152 that is addressed in preferred embodiments of the present invention. In summary, origin security scope supported by the Silverlight runtime provides an inadequate specificity for practical use in conjunction with widely distributed Web applications. This limitation is managed in preferred embodiments of the present invention by the qualifying the cross-origins communications policy of during the setup of the encapsulated application 152. Referring to FIG. 9, in response typically to some user interaction 162, the encapsulated Silverlight application 152 will process a Silverlight service request, represented as a WebSocket request 164, through the client library 56. As implemented in the preferred embodiments of the present invention, two headers will be automatically added to the WebSocket request 164. In the preferred embodiments of the present invention, the headers are specified as:

```
X-Origin: http://retailer.com:80
X-Origin-http%3A%2F%2Fretailer%3A80: http://retailer.com:80
``` where the first header identifies the effective source origin and the second is a dynamically generated header that encodes the source origin. In processing the WebSocket request 164 directed to the gateway server 42, the Silverlight runtime will recognize the cross-origin communications attempt. The Silverlight runtime will then initiate a pre-flight request 166 to retrieve a client access policy. The pre-flight request, by convention, is directed to the origin root to retrieve the specifically named "clientaccesspolicy.xml" document. Thus, where the defined target origin is http://gateway.com:2750, the document request is directed to http://gateway.com:2750/clientaccesspolicy.xml. The gateway server 42, in expectation of Silverlight access, listens for such requests and responds with a customized client access policy 168, subject to the gateway server 42 having a service access policy that permits cross-origin access. That is the source origin of the request is checked against the <cross-site-constraint> entries of the service access policy. Where the constraint is met, a clientaccesspolicy.xml document is dynamically generated and returned 168. The client access policy will be generally of the form:

```xml
<?xml version="1.0" encoding="utf-8"?>
<access-policy>
<cross-domain-access>
    <policy>
        <allow-from http-request-headers="X-Origin,
            X-Origin-http%3A%2F%2Fretailer.com%3A80">
            <domain uri="http://retailer.com"/>
        </allow-from>
        <grant-to>
            <resource path="/myService" include-subpaths="true"/>
        </grant-to>
    </policy>
</cross-domain-access>
</access-policy>
``` specifying that valid requests from the domain http://retailer.com to the path /myService, including subpaths, are allowed to include the two header values X-Origin and X-Origin-http%3A%2F%2Fretailer.com%3A80. This client access policy is registered with the Silverlight runtime with reference to the Silverlight encapsulated application 152. Consequently, in accordance with the present invention the Silverlight encapsulated application 152 will provide the headers as part of all Silverlight requests and the gateway server 42 will only accept Silverlight requests that have both headers. The dynamic generation and application of the client access policy as part of the pre-flight transaction 166, 168, qualifies the operation of the Silverlight runtime to, in turn, permit and pass such requests. The Silverlight runtime will continue to block requests having non-conforming headers. The gateway server 42 will disallow any Silverlight requests without conforming headers.

Figure 10:
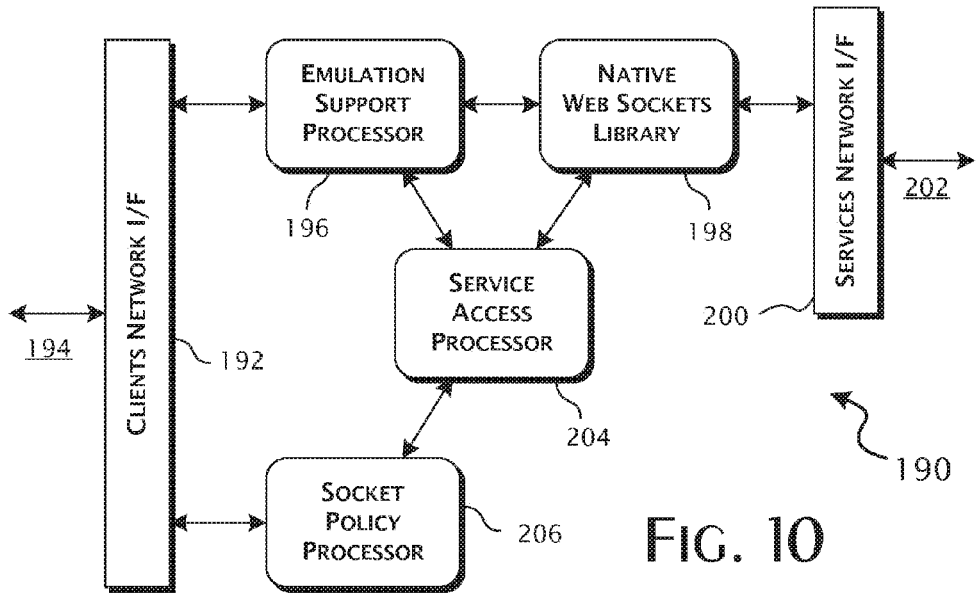
FIG. 10 is a block diagram of a preferred implementation of a gateway server as implemented in a preferred embodiment of the present invention.

Referring to FIG. 10, a preferred implementation 190 of a gateway server 42 is shown. In the preferred embodiments, the gateway server 42 is implemented on a conventional Web server system configured to support network connections to Web-browser clients 32 and various origin servers 34, 36, 38. Functionally, a client network interface 192 supports network connections 194 with Web-browser clients 32. Requests, originating from client libraries 56, are directed to an emulation support processor 196, preferably implemented as an even driven module hosted within an application server executed by the gateway server 42. Initially processed requests are then implemented through a native WebSockets library 198 that is capable of establishing TCP and other network connections 202 through a services network interface 200 to remote origin servers 36, 28 providing requested WebSocket compatible services.

A service access processor 204 also executing as an event driven module within the application server hosted by the gateway server 42, evaluates and qualifies requests received by the emulation support processor 196. Client access requests issued during Flash and Silverlight pre-flight operations are received and handled by a socket policy processor 206. The service access processor 204 is accessed by the socket policy processor 206, as needed to qualify the origins identified in Flash and Silverlight pre-flight requests.

The gateway server 42, specifically the emulation support processor 196 preferably supports redirection of service requests. The service access processor 204, in addition to qualifying service requests, may specify a service target redirection. Nominally, such a redirection would be implemented by the return of a conventional HTTP 30X response to a service request. Embodiments of the present invention utilizing iframe 96 instances for WebSocket communications with the gateway server 42, however, are limited in the handling of such redirection requests. Specifically, an iframe 96 instance cannot handle a redirection to an origin outside of the scope of the target origin established during the creation of the iframe 96 instance. Other technologies used in implementing the encapsulated program 152 may be similarly limited in automatically handling redirection requests.

Figure 11:
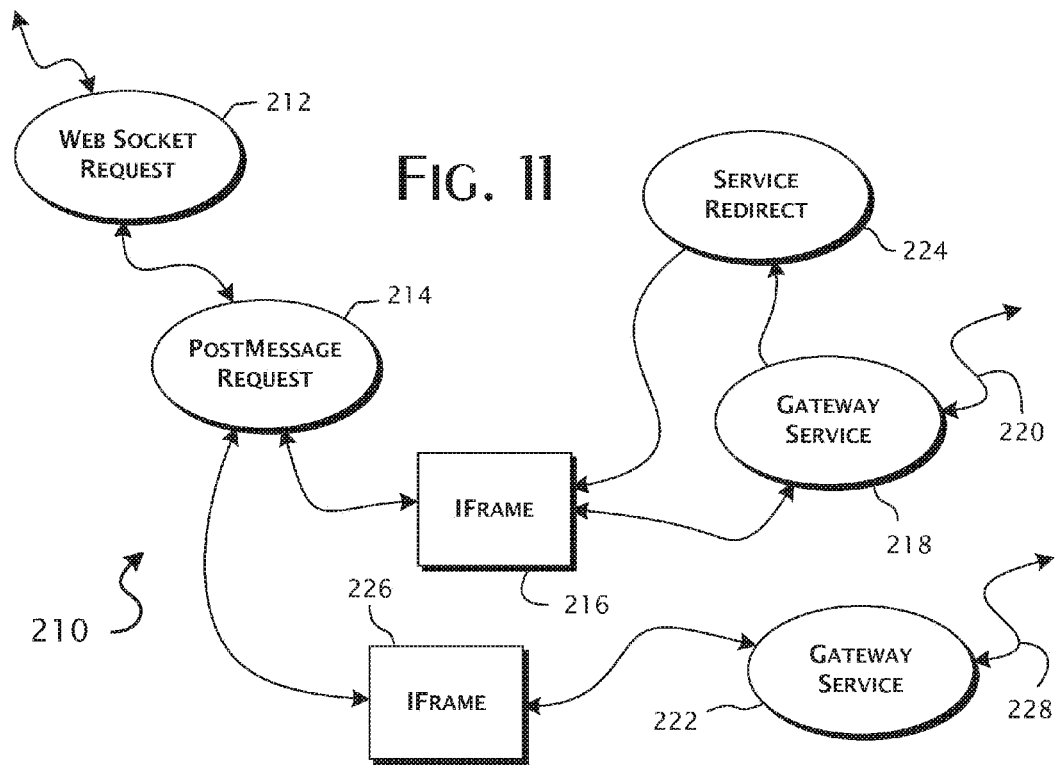
FIG. 11 is a flow diagram illustrating a preferred service redirection technique used in conjunction with a preferred embodiment of the present invention.

In affected preferred embodiments, an alternate redirection processing flow 210, as shown in FIG. 11, is preferably used. For clarity, the redirection processing flow 210 is described specific to the Javascript implementation. As previously described, a WebSocket request 212 is processed as a postMessage request 214 through the PostMessage layer 74 of the client library 56 and a corresponding iframe 96 instance 216. A request 218 for the corresponding service is made to a gateway server 42. Nominally, the request is handled by connection 220 to the requested service on a remote target server 36, 38.

The gateway server 42 instance 218 may instead determine that a redirection to a different gateway server 42 instance 222 is appropriate. This determination is made based on an evaluation of the local, administratively established service access policy and preferably identifies the redirection target gateway server 42 instance 222. The redirection is preferably implemented by the creation of a service redirect 224 message returned to the iframe 216. The service redirect 224 message is specifically provided as an HTTP 20X message wrapping an HTTP 30X redirection message. While the iframe 216 might fail to handle an explicit HTTP 30X message, if the redirection is cross-origin, the iframe 216 is able to receive an HTTP 20X message and return the contained payload data as a compliant response to the originating postMessage request 214. The PostMessage layer 74 further returns the message payload to the WebSocket emulation layer 80 for evaluation. In the specific case of a returned message payload corresponding to an HTTP 30X redirection, the WebSocket emulation layer 80 emulates the redirection directive by reissuing the postMessage request 214 to the redirection target gateway server 42 instance 222, as specified by the HTTP 30X redirection message. An iframe 96 instance 226, corresponding to the target origin of the gateway server 42 instance 222, is utilized. Provided the gateway server 42 instance 222 does not perform further redirection, a connection 228 is made to the request identified service on a remote target server 36, 38.

A generally equivalent redirection processing flow 210 is implemented for other implementing technologies, such as Java, Flash and Silverlight. Where applicable in these cases, the bridge application 158 instances are limited to a defined target origins, thus precluding an immediate handling of a redirection request. A wrapped HTTP 30X redirection message is again preferably provided 224 to the bridge application 158 instance, allowing the content to be returned to the client application 156 and handled by the WebSocket emulation layer 80 within the client application 156.

A should be evident, any other response messages that would be problematic to be handled immediately in an iframe 96 or bridge application 158 instance can be handled in a manner similar to the redirection processing flow 210. That is, any such problematic response may be wrapped in an HTTP 200 response message, enabling the enclosed response message to be handled by the document 92 or client application 156.

Figure 12:
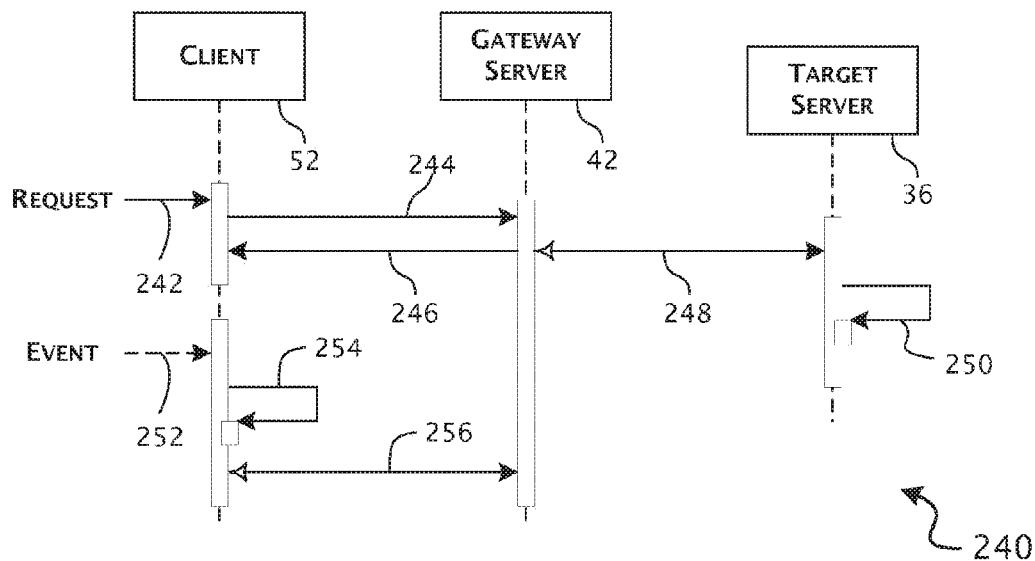
FIG. 12 provides a sequence diagram showing the preferred process of establishing emulated WebSocket connections between a Web browser client and a gateway server in accordance with a preferred embodiment of the present invention.

The preferred 240 process of establishing an emulated WebSocket connection between a Web browser client 52 and gateway server 42 is shown in FIG. 12. In response to a client-side WebSocket emulation, or similar, request 242 against a client library 56, an HTTP connection 244 is initially made to the gateway server 42. The connection 244 is, however, not closed by the gateway server 42, but rather maintained open 246 and used for the transmission of data downstream from the gateway server 42 to the Web client browser 52 in effective emulation of one half of a bidirectional WebSockets communications session. The service request provided through the connection 244 is preferably used by the gateway server 42 to establish a conventional bi-directional, TCP-based, WebSocket connection 248 with an appropriate remote target server 36 identified as effectively hosting the requested service. Once the connection 248 is established, the corresponding service 250 may select and send data as an asynchronous series of Server-Sent Events relayed over the open connection 246.

Preferably, upstream communications, occurring in response to some user event 252 or based on the autonomous execution of the client side Web application 254, are sent on a separate HTTP connection 256 as a cross-origin resource request transmitted as an XmlHttpRequest to the gateway server 42. Preferably, the request is sent in emulation using the Server Sent Events message syntax. This preference is largely for consistency in handling the bidirectional communications and, further, permits reliable message delivery through the WebSocket based on the reliable delivery message mechanism of the Server-Sent Event layer 78. That is, in the preferred embodiments, the emulated server sent message syntax includes event IDs that are tracked for receipt acknowledgment. Server-Sent Event messages are preferably buffered until a corresponding acknowledgment message has been received, thereby allowing retransmission in the circumstance, or apparent circumstance, of a message delivery failure. Upstream messages received through the connection 256 are routed by the gateway server 42 through the bidirectional WebSocket connection 248 for consideration and appropriate response by the service 250.

Upstream communications are typically limited in number and tend to be short messages. This in combination with the concurrent connection limit implemented in conventional Web browser clients, results in a preference for using transient upstream connections from the Web browser client to the gateway server 42. Under emulation, then, preferably only the downstream connection 246 is maintained as a persistent communications connection.

Figure 13:
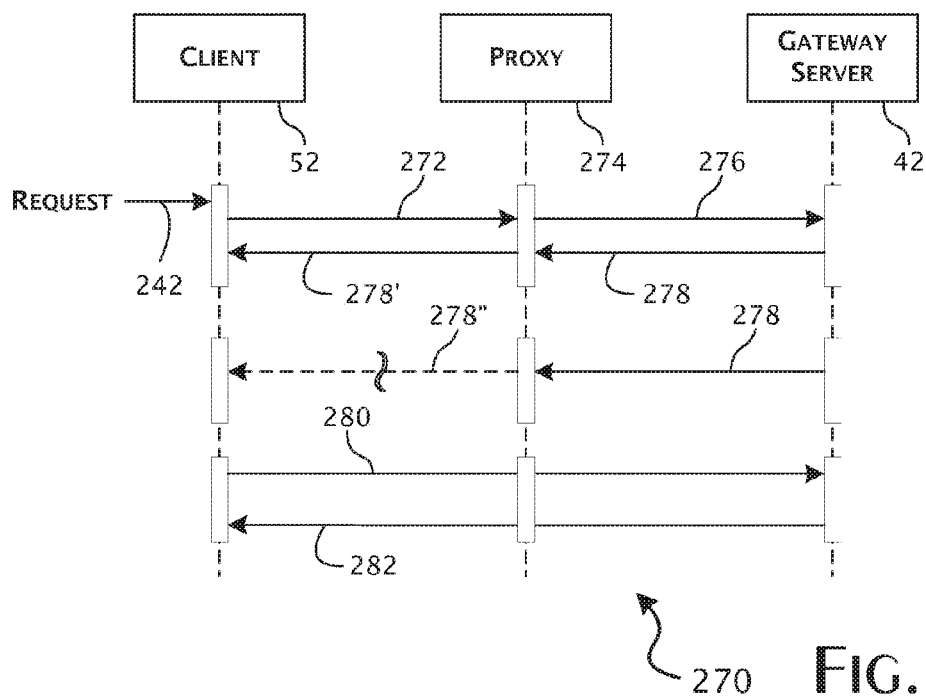
FIG. 13 provides a sequence diagram illustrating the handling of proxy server involvement in the establishment and maintenance of emulated WebSocket connections between a Web browser client and a gateway server in accordance with a preferred embodiment of the present invention.

By the nature of a conventional, native WebSocket connection, the presence of proxy and other relay servers may be tolerated in the path of a WebSocket connection. In the preferred embodiments of the present invention, the WebSocket emulation layer 80, in combination with the gateway server 42, preferably implements functional monitoring of the state of the downstream connection 246 in order to detect the presence or problematic behavior of any proxy or other server in the path of the downstream connection 246. Referring to FIG. 13, operation 270 of the present invention tolerant of the potential presence of a proxy server is shown. A request 242 to initiate a WebSocket connection results in the creation of a HTTP connection upstream that happens to route to a proxy server 274. A corresponding HTTP connection 276 is, in turn, created and routes to the gateway server 42. As before, this connection is not terminated, but rather maintained open as connection 278. An intervening proxy sever 274 will typically maintain the corresponding connection 278' open, though the exact behavior of the proxy server 274 is determined by the local configuration of the proxy server 274. Although the gateway server 42 may maintain open the connection 278, the proxy server 274 may buffer downstream transmitted data or, as a matter of configuration policy, terminate the connection 278" altogether.

In either event, the Web browser client receives limited data, data subject to arbitrary latencies determined by the proxy server 274, or a termination of all data delivery.

In accordance with the present invention, the gateway server 42 will autonomously transmit heartbeat packets through the open downstream connection 278 connection whenever the connection becomes idle for longer than a threshold period of time. In the presently preferred embodiments, the heartbeat threshold is five seconds. Should the WebSocket emulation layer 80 fail to receive any data through the connection 278" in excess of the heartbeat period, the presence of a proxy server is presumed and a disconnect is sent upstream through the connection 278", provided the connection 278" was not terminated by the proxy server 274. The disconnect will result in a flush of any buffered data held by the proxy server 274. A new connection 280 to the gateway server 42, preferably using the HTTPS protocol, is established. The connection 280 is, again, kept open as a persistent downstream connection 282. A connection using the HTTPS protocol is, by default, not preferred due to the greater overhead on both the Web browser client 52 and gateway server 42 to establish and process data through the connection. The HTTPS connection is, however, preferred where an intervening proxy server 274 is detected since the protocol will almost always be passed through the proxy servers 274 without buffering or interruption. Where an HTTPS connection cannot be established, a fall-back to long-polling is preferably implemented. The downstream connection 282 can therefore be effectively maintained persistent even in the presence of proxy servers 274. Any Server-Sent Events that remain unacknowledged in the event of the connection failure 278" are resent automatically. Consequently, the integrity of the downstream connection is maintained. A similar heartbeat mechanism is preferably implemented on the Web-browser client 52, preferably in the WebSocket emulation layer 80, to allow the gateway server to detect upstream connection limitations.

Thus, a system and methods for achieving bidirectional Web browser client communication, which is vital for real-time Web applications, have been described. An emulated WebSocket server system that enables conventional pre-HTML5 compliant Web-browsers to immediately support bidirectional, full-duplex binary and text communication. Therefore, complex conventional distributed Web application architectures can be avoided. Instead, through use of the present invention, Web-applications can directly communicate with backend services using native protocols transported through an emulated WebSocket over HTTP.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A method, comprising:
   receiving a request to establish a bi-directional full-duplex network connection, wherein the request conforms to a half-duplex network connection protocol and the half-duplex connection protocol is a HTTP based protocol;
   using a processor to process the request to determine a decision on whether to allow the bi-directional full-duplex connection;
   in the event the decision is to allow the bi-directional full-duplex connection, establishing the bi-directional full-duplex network connection using the half-duplex network connection protocol, wherein the bi-directional full-duplex connection utilizes a WebSocket communication protocol and establishing the bi-directional full-duplex connection utilizes a plurality of half-duplex connections; and providing a confirmation that the bi-directional full-duplex network connection has been established.

2. The method of claim 1, wherein the bi-directional full-duplex connection provides a real-time communication channel.

3. The method of claim 1, wherein the bi-directional full-duplex connection is based at least in part on TCP.

4. The method of claim 1, wherein the request includes configuration information of the bi-directional full-duplex connection.

5. The method of claim 4, wherein the configuration information is associated with an access policy.

6. The method of claim 4, wherein the configuration information includes a source origin identifier.

7. The method of claim 4, wherein the configuration information includes a target origin identifier.

8. The method of claim 4, wherein the configuration information includes a requested service identifier.

9. The method of claim 1, further comprising evaluating a service access policy associated with the request.

10. The method of claim 1, wherein the confirmation identifies that the request has been accepted.

11. The method of claim 1, wherein the request is received from a client.

12. The method of claim 1 wherein the request is received from a web-browser.

13. The method of claim 1, wherein the bi-directional full-duplex connection enables cross-origin communication.

14. A system, comprising;
   a communication interface configured to
      receive a request to establish a bi-directional full-duplex network connection, wherein the request conforms to a half-duplex network connection protocol and the half-duplex connection protocol is a HTTP based protocol; and
   a processor coupled with the communication interface and configured to
      process the request to determine a decision on whether to allow the bi-directional full-duplex connection,
      in the event the decision is to allow the bi-directional full-duplex connection, establish the bi-directional full-duplex network connection using the half-duplex network connection protocol, wherein the bi-directional full-duplex connection utilizes a Web Socket communication protocol and establishing the bi-directional full-duplex connection utilizes a plurality of half-duplex connections, and
      provide a confirmation that the bi-directional full-duplex network connection has been established.

15. The system of claim 14, wherein the bi-directional full-duplex connection provides a real-time communication channel.

16. The system of claim 14, wherein the bi-directional full-duplex connection is based at least in part on TCP.

17. The system of claim 14, wherein the system is included in a gateway server.

18. The system of claim 14, wherein the request includes configuration information of the bi-directional full-duplex connection.

19. The system of claim 14, wherein the processor is configured to evaluate a service access policy associated with the request.

20. A computer program product, the computer program product being embodied in a non-transitory computer readable storage medium and comprising computer instructions for:
   receiving a request to establish a bi-directional full-duplex network connection, wherein the request conforms to a half-duplex network connection protocol and the half-duplex connection protocol is a HTTP based protocol;
   processing the request to determine a decision on whether to allow the bi-directional full-duplex connection;
   in the event the decision is to allow the bi-directional full-duplex connection, establishing the bi-directional full-duplex network connection using the half-duplex network connection protocol, wherein the bi-directional full-duplex connection utilizes a WebSocket communication protocol and establishing the bi-directional full-duplex connection utilizes a plurality of half-duplex connections; and
   providing a confirmation that the bi-directional full-duplex network connection has been established.

* * * * *

UNITED STATES PATENT AND TRADEMARK OFFICE
CERTIFICATE OF CORRECTION

PATENT NO. : 9,794,304 B2  Page 1 of 1
APPLICATION NO. : 15/256093
DATED : October 17, 2017
INVENTOR(S) : John R. Fallows et al.

It is certified that error appears in the above-identified patent and that said Letters Patent is hereby corrected as shown below:

In Column 4, Line 20, delete "serve" and insert --server--, therefor.

In Column 12, Line 61, before "origin" insert --target--.

Signed and Sealed this
Twenty-seventh Day of March, 2018

Andrei Iancu
*Director of the United States Patent and Trademark Office*